(12) United States Patent
Warren et al.

(10) Patent No.: US 9,661,858 B2
(45) Date of Patent: May 30, 2017

(54) NESTING BAKING OVEN RACKS

(71) Applicant: NATIONAL CART CO., INC., St. Charles, MO (US)

(72) Inventors: James L. Warren, Glen Carbon, IL (US); Thomas L. Rattini, Foristell, MO (US); Robert H. Unnerstall, Jr., Wentzville, MO (US)

(73) Assignee: NATIONAL CART CO., INC., St. Charles, MO (US)

( * ) Notice: Subject to any disclaimer, the term of this patent is extended or adjusted under 35 U.S.C. 154(b) by 270 days.

(21) Appl. No.: 14/659,594

(22) Filed: Mar. 16, 2015

(65) Prior Publication Data

US 2015/0282492 A1 Oct. 8, 2015

Related U.S. Application Data

(60) Provisional application No. 61/976,960, filed on Apr. 8, 2014.

(51) Int. Cl.
| | |
|---|---|
| *A21B 1/50* | (2006.01) |
| *A47F 5/10* | (2006.01) |
| *A47F 10/06* | (2006.01) |
| *B25H 3/04* | (2006.01) |
| *A47F 1/00* | (2006.01) |

(52) U.S. Cl.
CPC .................. *A21B 1/50* (2013.01); *A47F 5/10* (2013.01); *A47F 10/06* (2013.01); *B25H 3/04* (2013.01); *A47F 1/00* (2013.01)

(58) Field of Classification Search
CPC ... A21B 1/50; A47F 10/06; A47F 5/10; A47F 1/00; B25H 3/04

USPC ....................................................... 211/133.1
See application file for complete search history.

(56) References Cited

U.S. PATENT DOCUMENTS 4,349,213 A * 9/1982 Hirsch ...................... B62B 1/00
126/283
5,125,520 A * 6/1992 Kawasaki .............. A47B 31/04
108/91

(Continued)

FOREIGN PATENT DOCUMENTS

CA 2169336 A1 8/1996

*Primary Examiner* — Sean Michalski
(74) *Attorney, Agent, or Firm* — Harness, Dickey & Pierce, P.L.C.

(57) ABSTRACT

A nesting bakery oven rack has first and second vertical side panels extending between the front and the rear of the rack. The rack has a generally x-shaped base comprising a first diagonal brace extending from a point adjacent the front of the first side panel to a point adjacent the rear of the second side panel. A first slot in the first side panel extends from the rear of the first side panel toward the front to accommodate the first brace of another nesting bakery oven rack nested with the nesting bakery oven rack at the rear. A second slot in the second side panel extends from the front of the second side panel toward the rear of the second side panel to accommodate the first diagonal brace of another nesting bakery oven rack nested with the nesting bakery oven rack at the front. A second diagonal brace extending from a point adjacent the front of the second side panel to a point adjacent the rear of the first side panel, the ends of the second diagonal brace being out of the horizontal plane of first brace.

10 Claims, 18 Drawing Sheets

(56) References Cited

U.S. PATENT DOCUMENTS

| | | | |
|---|---|---|---|
| 5,269,112 A * | 12/1993 | Weinrub | G09F 15/0068 |
| | | | 211/189 |
| 5,330,064 A | 7/1994 | Hall | |
| 5,628,522 A | 5/1997 | Hall | |
| 5,685,442 A * | 11/1997 | Yoshino | A47B 43/00 |
| | | | 211/126.1 |
| 5,957,309 A * | 9/1999 | Hall | A47B 47/021 |
| | | | 211/126.2 |
| 6,062,401 A | 5/2000 | Hall et al. | |
| 6,203,035 B1 * | 3/2001 | Ondrasik | B62B 3/006 |
| | | | 211/126.1 |
| 6,220,464 B1 * | 4/2001 | Battaglia | A47B 57/54 |
| | | | 108/107 |
| 6,311,856 B2 * | 11/2001 | Battaglia | A47B 57/54 |
| | | | 108/107 |
| 6,419,098 B1 | 7/2002 | Hall | |
| D480,528 S | 10/2003 | Hall | |
| D481,513 S | 10/2003 | Hall | |
| 6,974,042 B2 | 12/2005 | Hall | |
| D514,269 S * | 1/2006 | Polidoros | A21B 1/50 |
| | | | D34/17 |
| 7,419,063 B1 * | 9/2008 | Hall | A21B 1/44 |
| | | | 211/126.1 |
| D639,010 S * | 5/2011 | Barnts | A21B 1/50 |
| | | | D34/21 |
| 8,657,241 B2 * | 2/2014 | Zitting | A61M 5/1415 |
| | | | 211/194 |
| 9,364,104 B1 * | 6/2016 | Wood | A47F 5/0006 |
| 2003/0127815 A1 | 7/2003 | Hall | |
| 2003/0196975 A1 * | 10/2003 | Murray | A21B 1/50 |
| | | | 211/126.2 |
| 2005/0212233 A1 | 9/2005 | Hall | |
| 2014/0217043 A1 * | 8/2014 | Gonzalez | B62B 3/02 |
| | | | 211/85 |
| 2015/0041420 A1 * | 2/2015 | Zelek | A47B 43/00 |
| | | | 211/149 |

\* cited by examiner

NESTING BAKING OVEN RACKS

CROSS-REFERENCE TO RELATED APPLICATIONS

This application claims priority to U.S. Provisional Patent Application No. 61/976,960, filed Apr. 8, 2014. The entire disclosure of this application is incorporated herein by reference.

FIELD

The present disclosure relates to nesting baking oven racks.

BACKGROUND

This section provides background information related to the present disclosure which is not necessarily prior art.

Nesting baking oven racks are widely used in commercial baking to support trays of product, so that the product can be made, baked, and processed in an efficient manner. These racks must be sufficiently rigid to support the trays of product during processing, yet sufficiently lightweight that they can be easily handled. When not in use it is desirable that these racks either collapse, or more preferably nest, to minimize the space they occupy. There are various designs for nestable bakery oven racks, but in general these designs were either insufficiently strong or durable, or took up too much space when not in use.

SUMMARY

This section provides a general summary of the disclosure, and is not a comprehensive disclosure of its full scope or all of its features.

Embodiments of the present invention provide a nesting bakery oven rack that is strong and durable, yet which can be tightly nested when not is use to conserve space. Generally the nesting bakery oven rack of the preferred embodiment comprises first and second vertical side panels extending between the front and the rear of the rack. A generally x-shaped base connects the side panels. The base comprises a first diagonal brace adjacent the bottom of the nesting bakery oven rack, extending from a point adjacent the front of the first side panel to a point adjacent the rear of the second side panel. There is a first slot in the first side panel, extending from the rear of the first side panel toward the front of the first side panel, in the plane of the first diagonal brace, to accommodate the first brace of another nesting bakery oven rack nested with the nesting bakery oven rack at the rear. There is a second slot in the second side panel, extending from the front of the second side panel toward the rear of the second side panel, in the plane of the first diagonal brace, to accommodate the first diagonal brace of another nesting bakery oven rack nested with the nesting bakery oven rack at the front. A second diagonal brace adjacent the bottom of the nesting bakery oven rack, extends from a point adjacent the front of the second side panel to a point adjacent the rear of the first side panel. The ends of the second diagonal brace are out of the horizontal plane of first brace and the slots so that they do not interfere with nesting.

There can be at least one additional diagonal brace intermediate the top and bottom of the nesting bakery oven rack, extending from a point adjacent the front of the second side panel to a point adjacent the rear of the first side panel.

There can be a top structure including a front lateral support extending partway from the first side panel toward the second side panel at the front of the nesting bakery oven rack, a rear lateral support extending partway from the second side panel toward the first side panel at the rear of the nesting bakery oven rack; and a transverse member extending between the front and rear lateral support.

A top diagonal brace can be provided adjacent the top of the nesting bakery oven rack, extending from a point adjacent the front of the second side panel to a point adjacent the rear of the first side panel. The transverse member of the top construction preferably crosses and engages the top diagonal brace.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
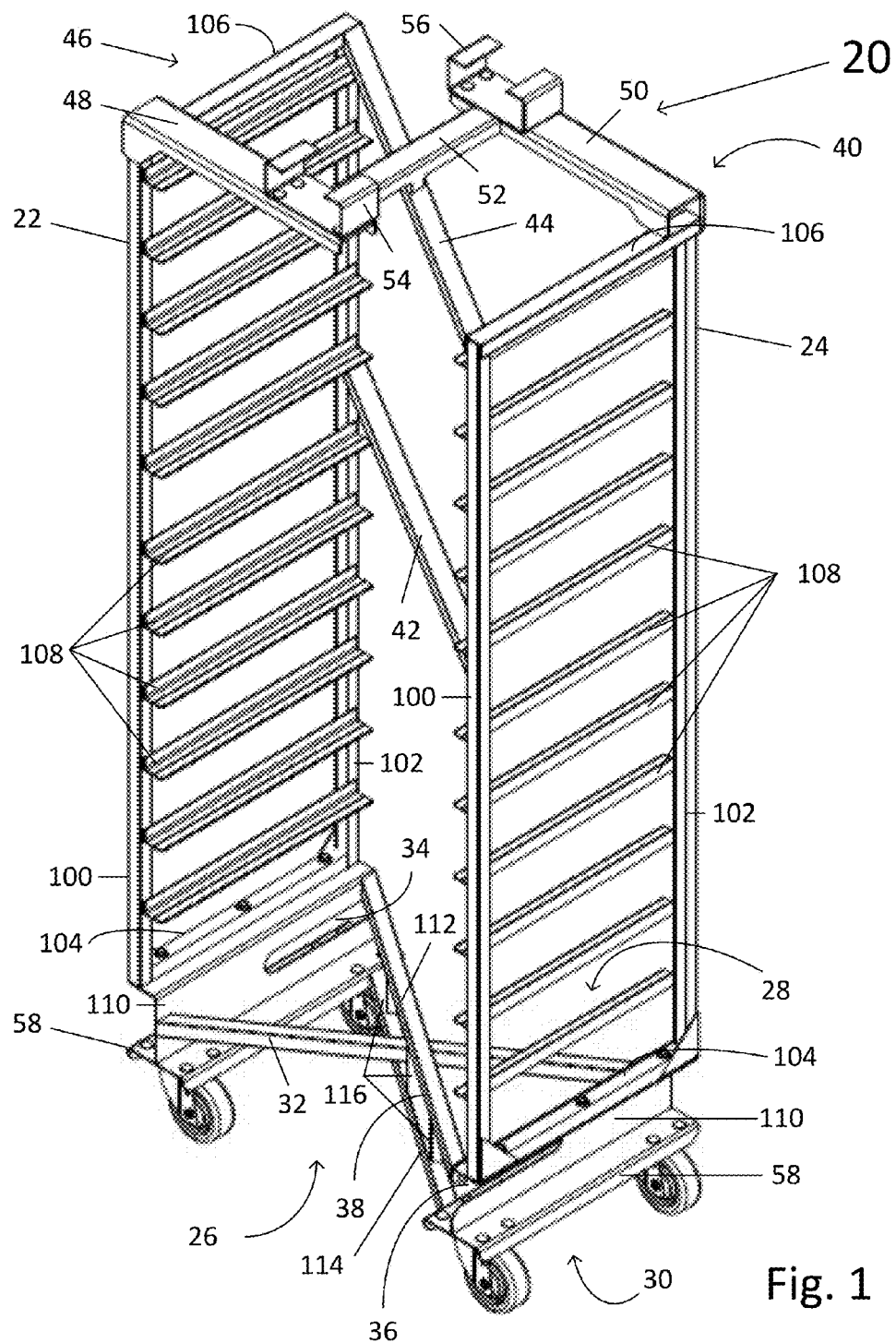
FIG. 1 is a perspective view of a first preferred embodiment of a nesting bakery oven rack in accordance with principles of this invention.

A nesting bakery oven rack according to a first preferred embodiment of this invention is indicated generally as 20 in FIG. 1. Rack 20 comprises first and second vertical side panels 22 and 24 extending between the front 26 and the rear 28 of the rack.

A first diagonal brace 32 adjacent the bottom 30 of the nesting bakery oven rack, extends from a point adjacent the front of the first side panel 22 to a point adjacent the rear of the second side panel 24.

Figure 2:
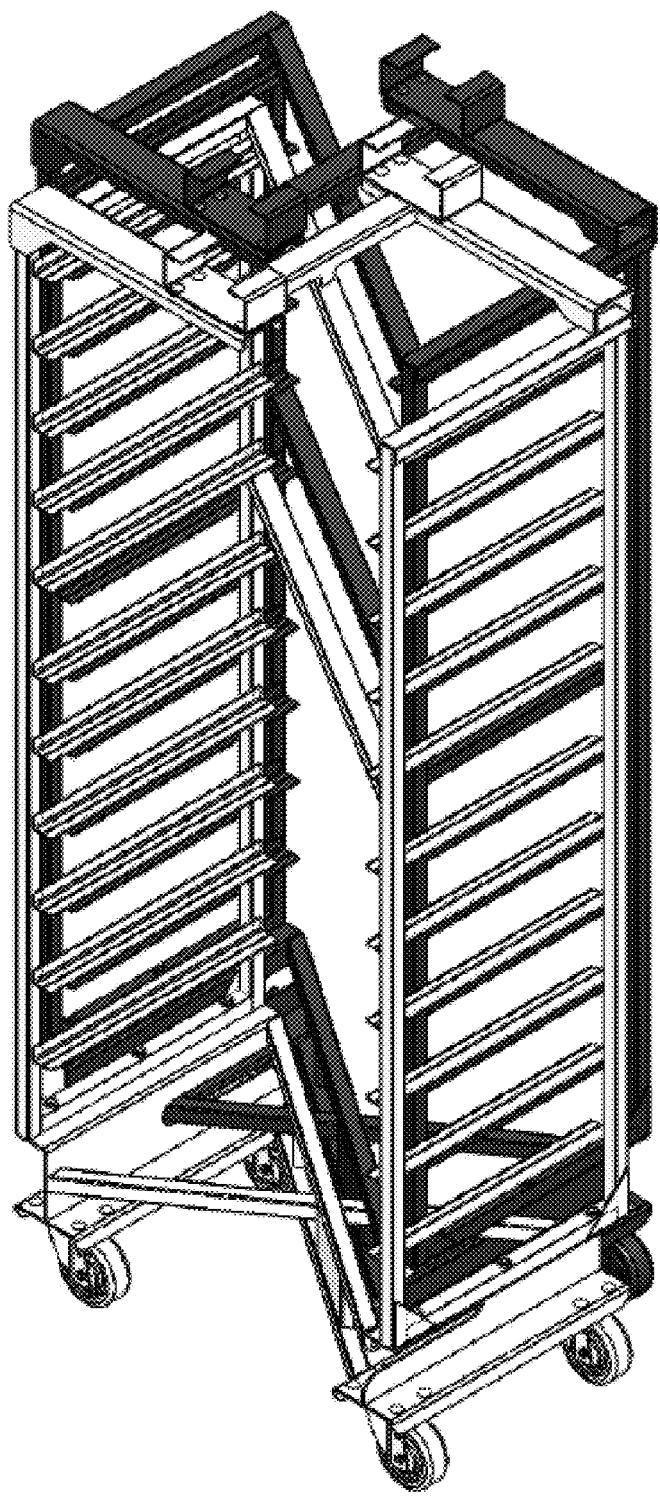
FIG. 2 is a perspective view showing two bakery oven racks of the first preferred embodiment nesting.
Figure 3:
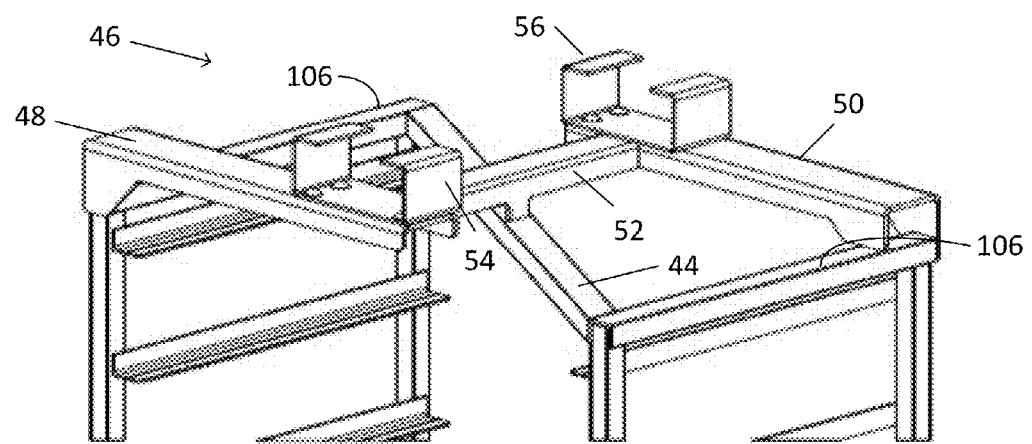
FIG. 3 is an enlarged perspective view of the top of the rack of the first preferred embodiment.
Figure 4:
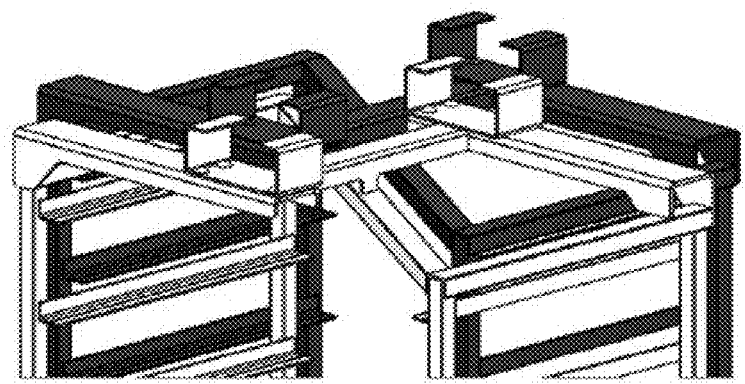
FIG. 4 is a perspective view of the tops of two racks of the first preferred embodiment nesting.
Figure 5:
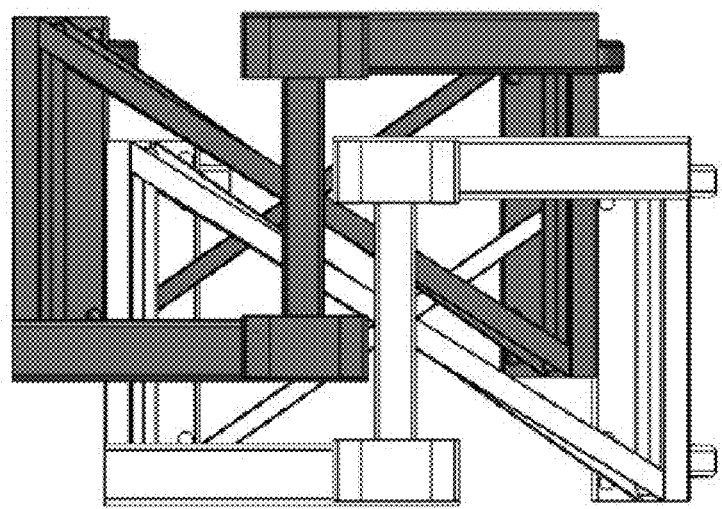
FIG. 5 is a top plan view of the tops of two racks of the first preferred embodiment nesting.
Figure 6:
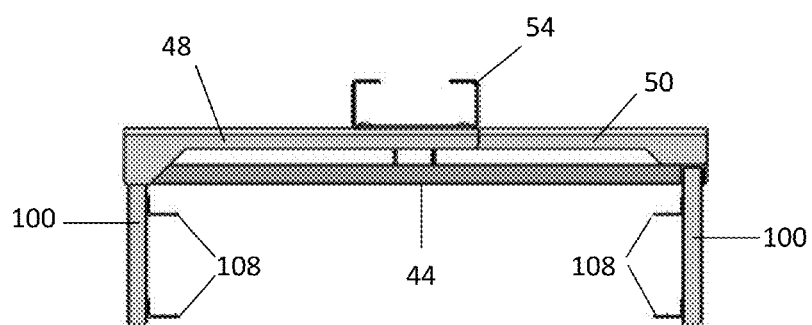
FIG. 6 is a front elevation view of the top of the rack of the first preferred embodiment.
Figure 7:
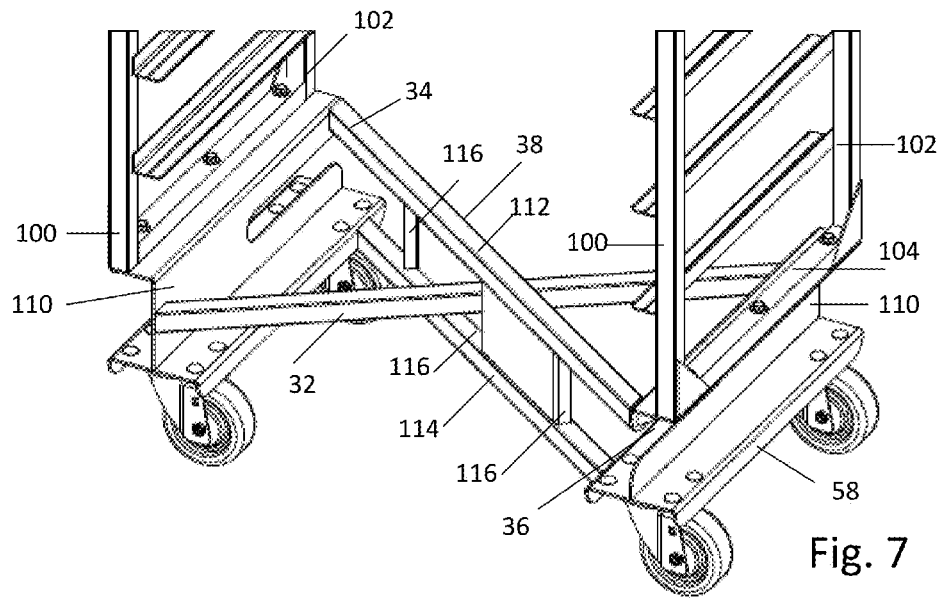
FIG. 7 is an enlarged perspective view of the bottom of the rack of the first preferred embodiment.
Figure 8:
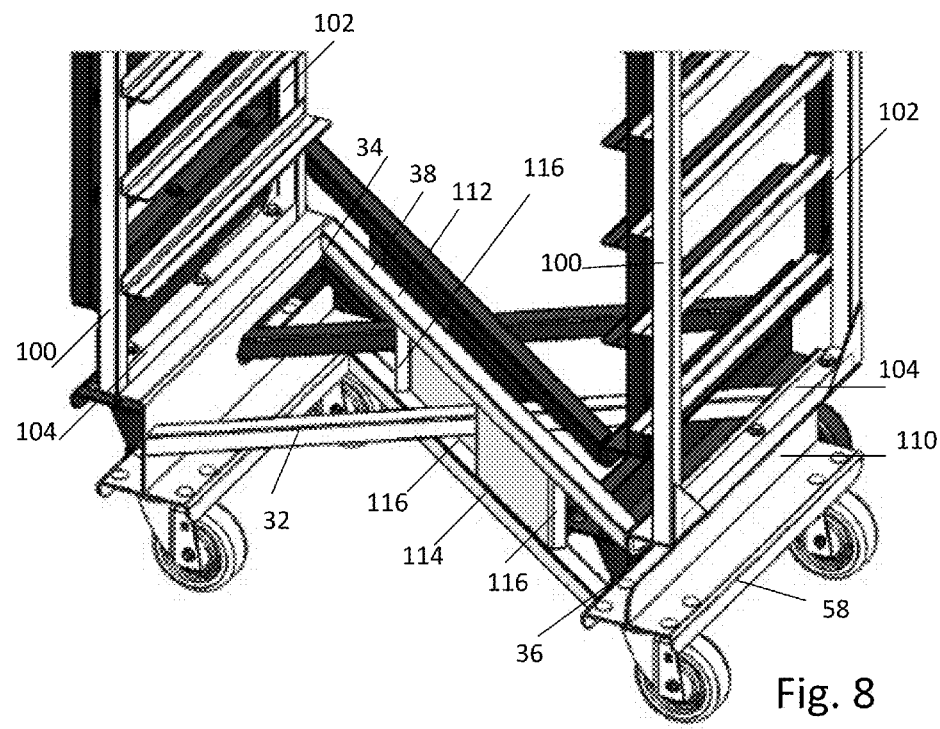
FIG. 8 is an enlarged perspective view of the bottoms of two racks of the first preferred embodiment nesting.
Figure 9:
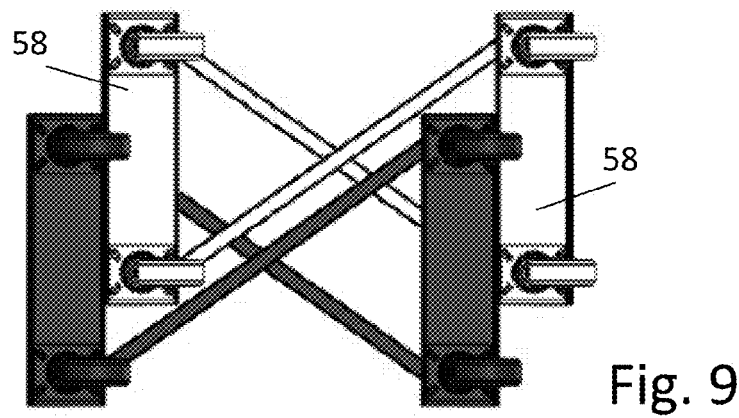
FIG. 9 is a bottom plan view of the bottoms of two racks of the first preferred embodiment nesting.
Figure 10:
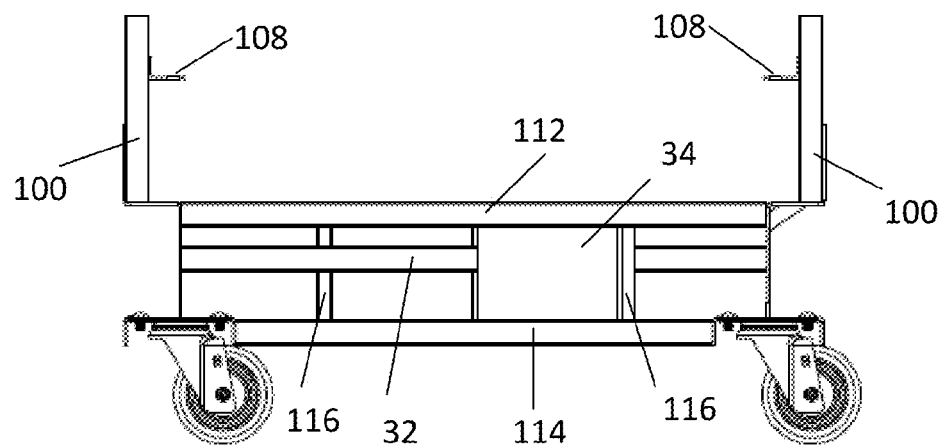
FIG. 10 is a partial front elevation view of the lower portion of rack of the first preferred embodiment.
Figure 11:
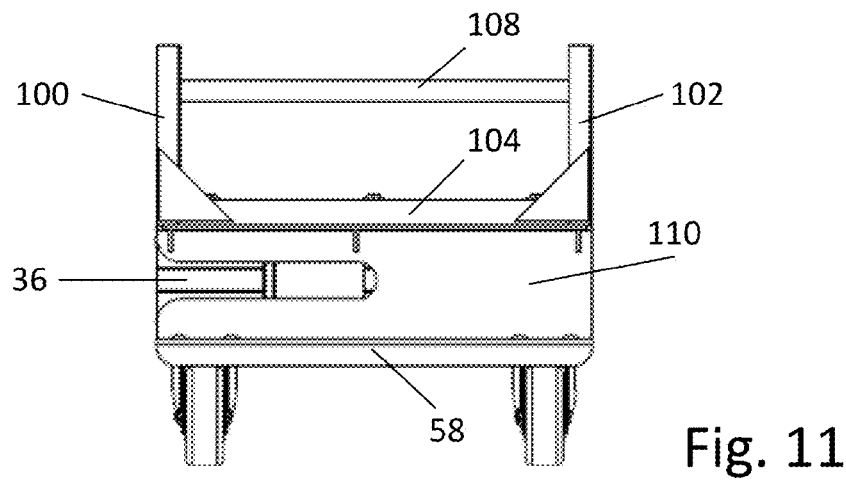
FIG. 11 is a partial side elevation view of the lower portion of rack of the first preferred embodiment.
Figure 12:
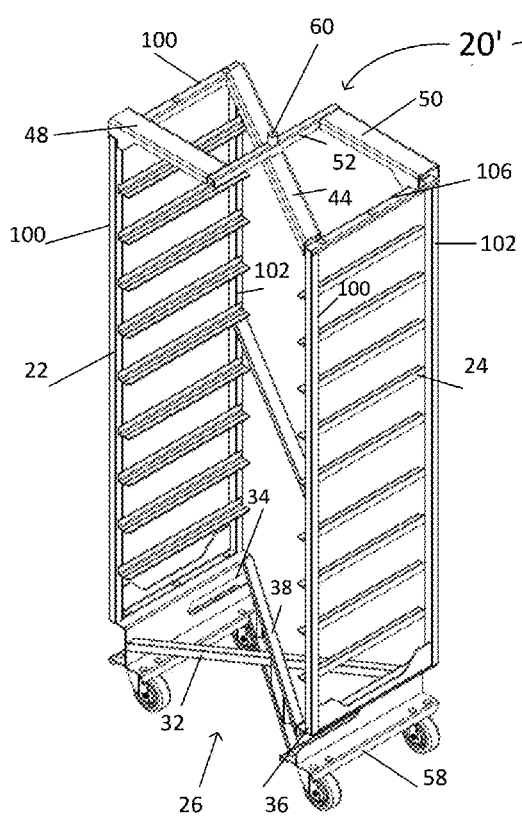
FIG. 12 is a perspective view of a second preferred embodiment of a nesting bakery oven rack in accordance with principles of this invention.
Figure 13:
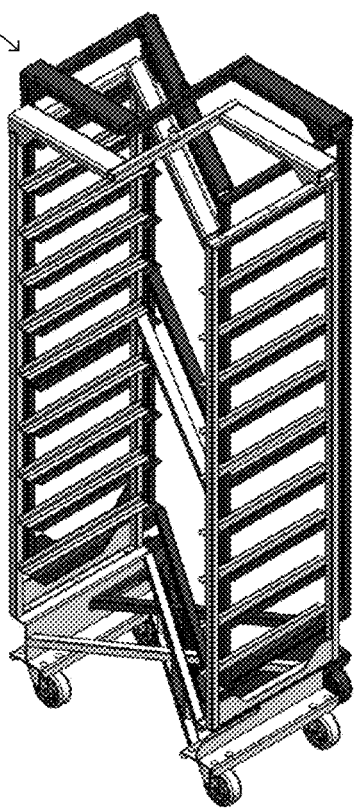
FIG. 13 is a perspective view showing two bakery oven racks of the second preferred embodiment nesting.
Figure 14:
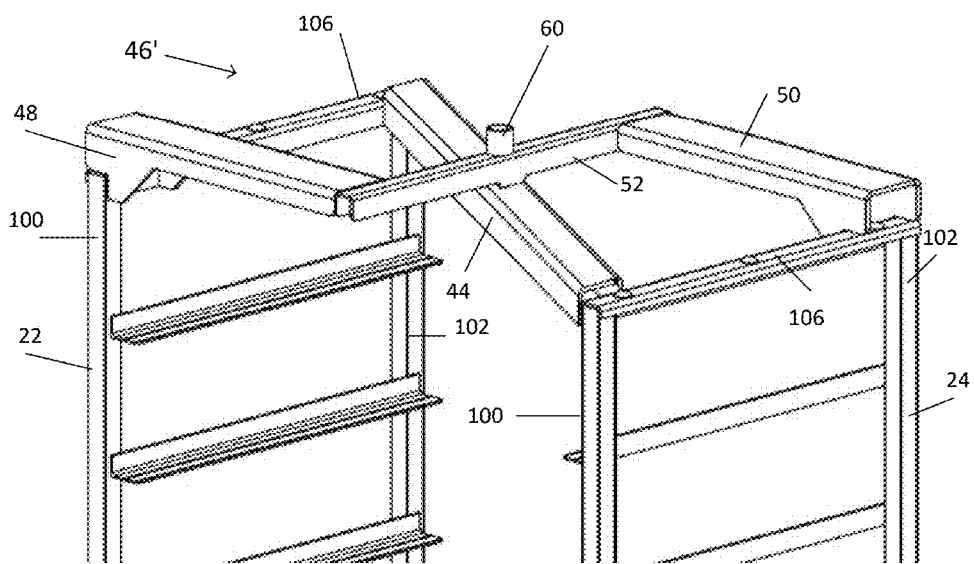
FIG. 14 is an enlarged perspective view of the top of the rack of the second preferred embodiment.
Figure 15:
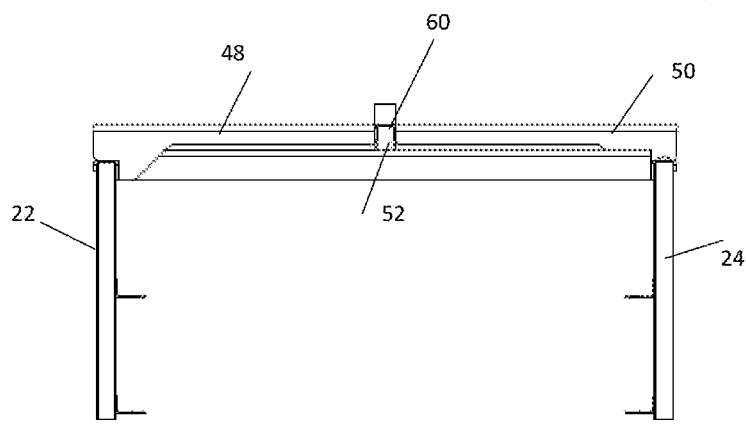
FIG. 15 is a front elevation view of the top of the rack of the second preferred embodiment.
Figure 16:
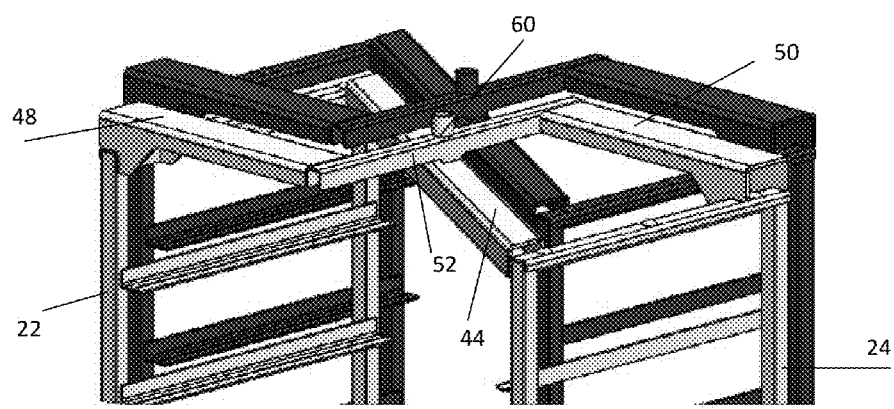
FIG. 16 is a perspective view of the tops of two racks of the second preferred embodiment nesting.
Figure 17:
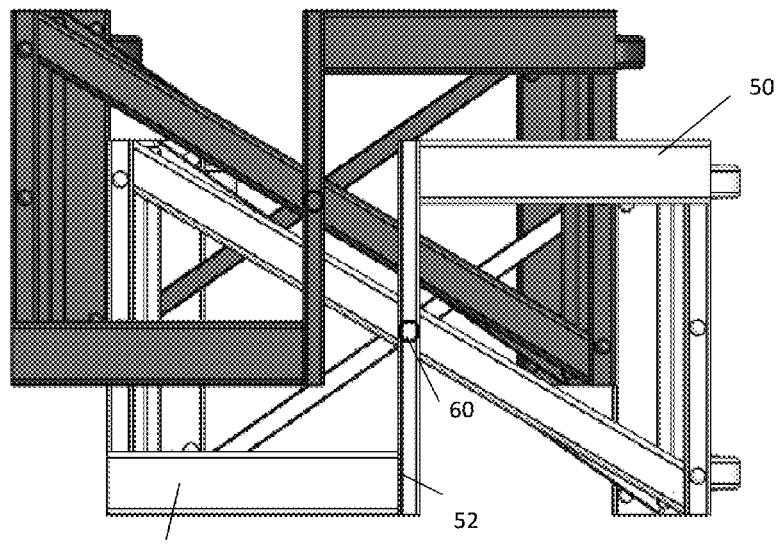
FIG. 17 is a top plan view of the tops of two racks of the second preferred embodiment nesting.
Figures 18, 19:
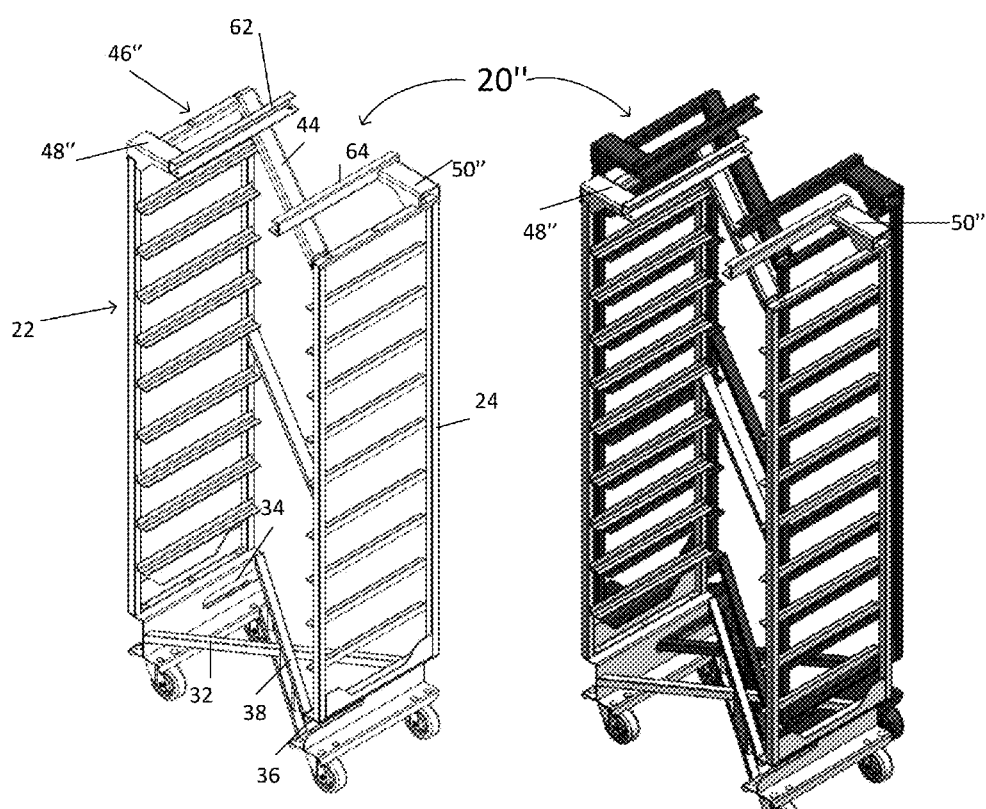
FIG. 18 is a perspective view of a third preferred embodiment of a nesting bakery oven rack in accordance with principles of this invention.
FIG. 19 is a perspective view showing two bakery oven racks of the third preferred embodiment nesting.
Figure 20:
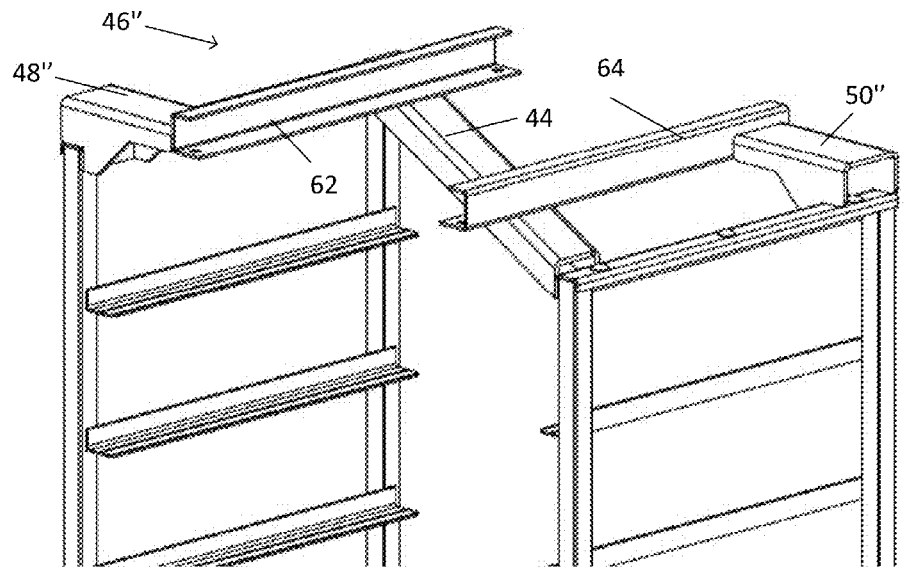
FIG. 20 is an enlarged perspective view of the top of the rack of the third preferred embodiment.
Figure 21:
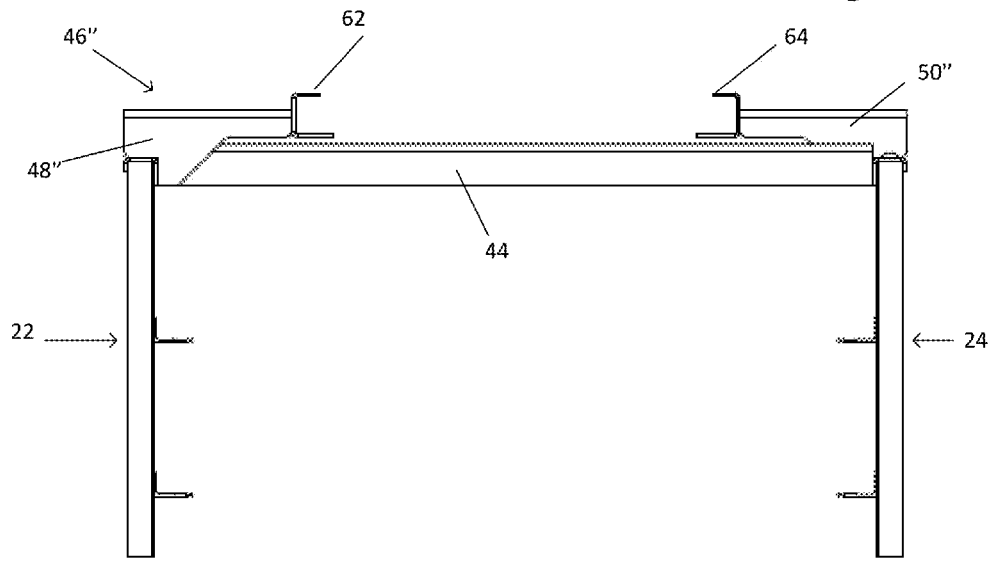
FIG. 21 is a front elevation view of the top of the rack of the third preferred embodiment.
Figure 22:
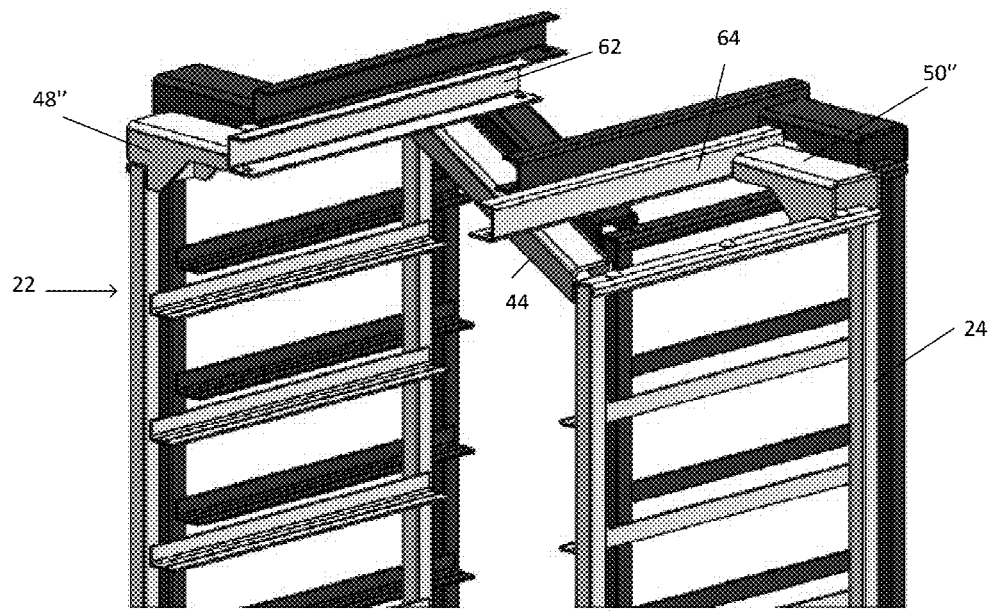
FIG. 22 is a perspective view of the tops of two racks of the third preferred embodiment nesting.
Figure 23:
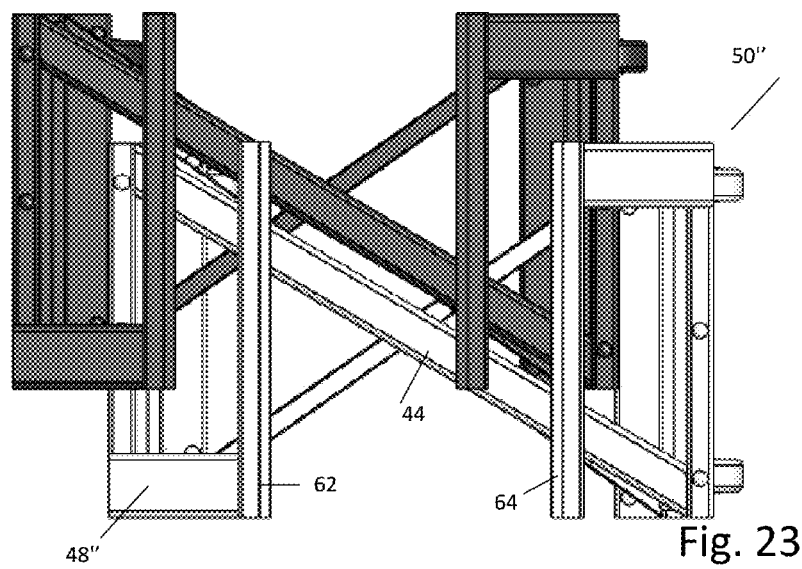
FIG. 23 is a top plan view of the tops of two racks of the third preferred embodiment nesting.
Figures 24, 25:
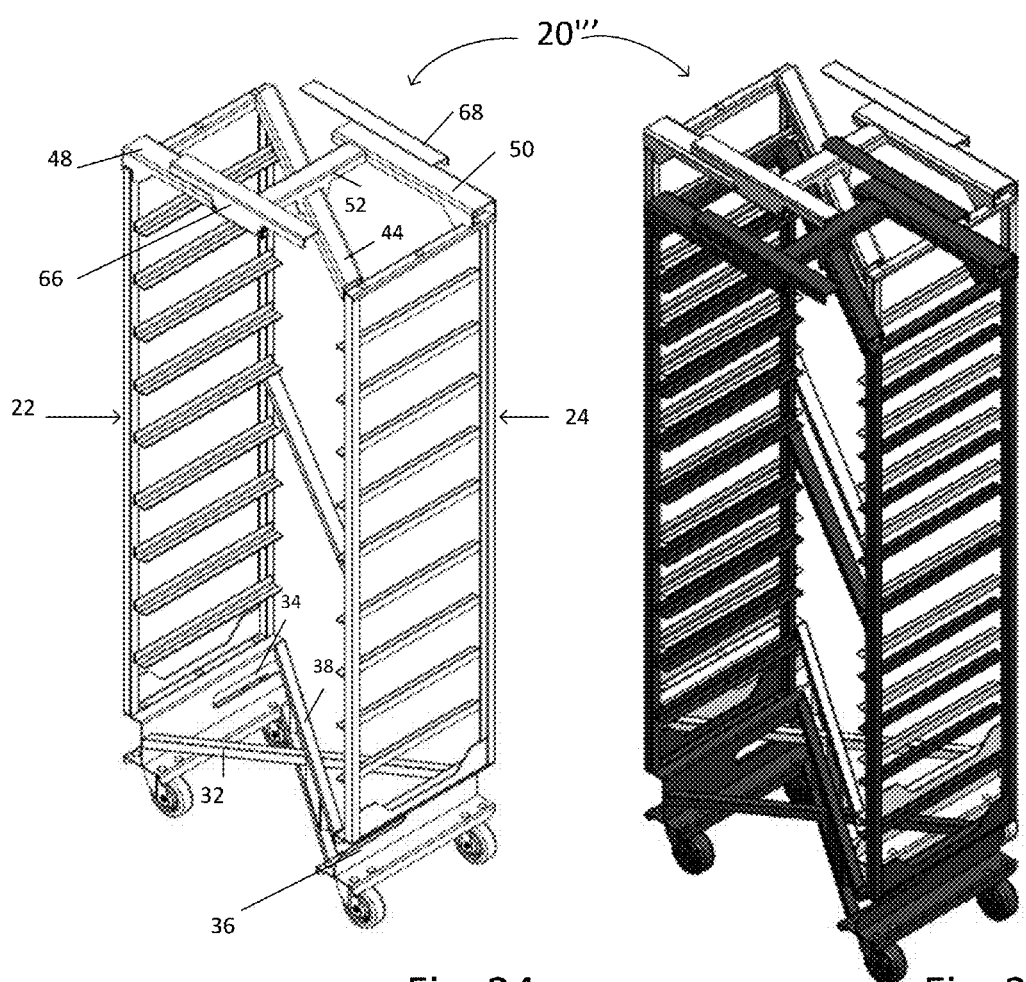
FIG. 24 is a perspective view of a fourth preferred embodiment of a nesting bakery oven rack in accordance with principles of this invention.
FIG. 25 is a perspective view showing two bakery oven racks of the fourth preferred embodiment nesting.
Figure 26:
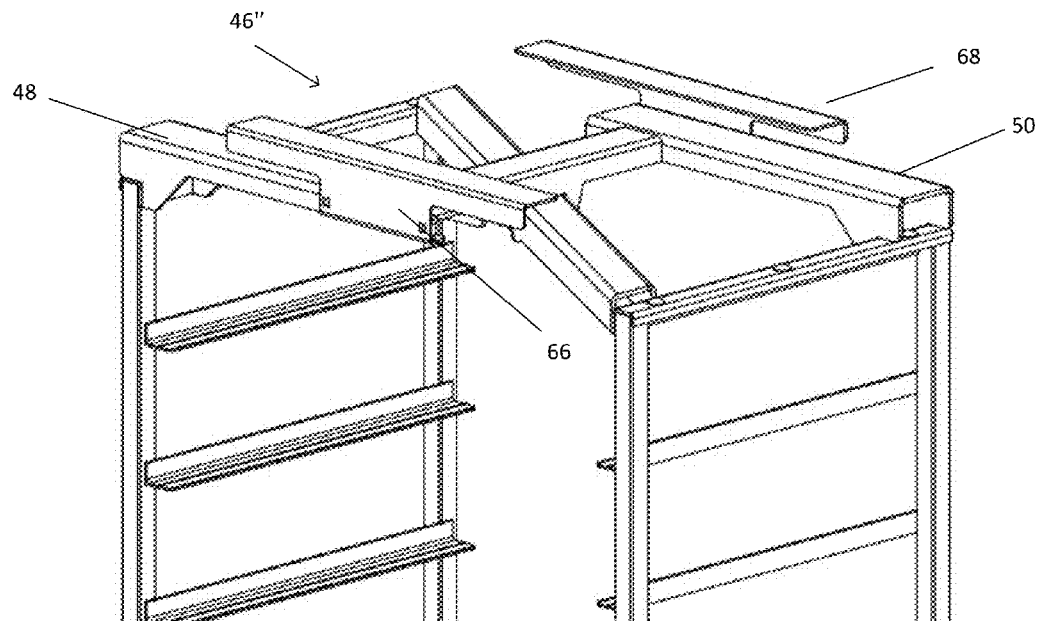
FIG. 26 is an enlarged perspective view of the top of the rack of the fourth preferred embodiment.
Figure 27:
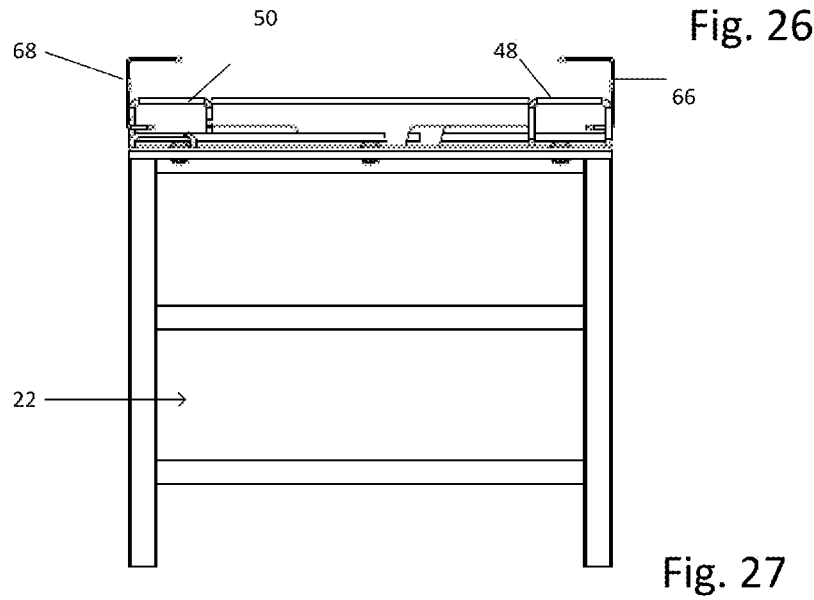
FIG. 27 is a front elevation view of the top of the rack of the fourth preferred embodiment.
Figure 28:
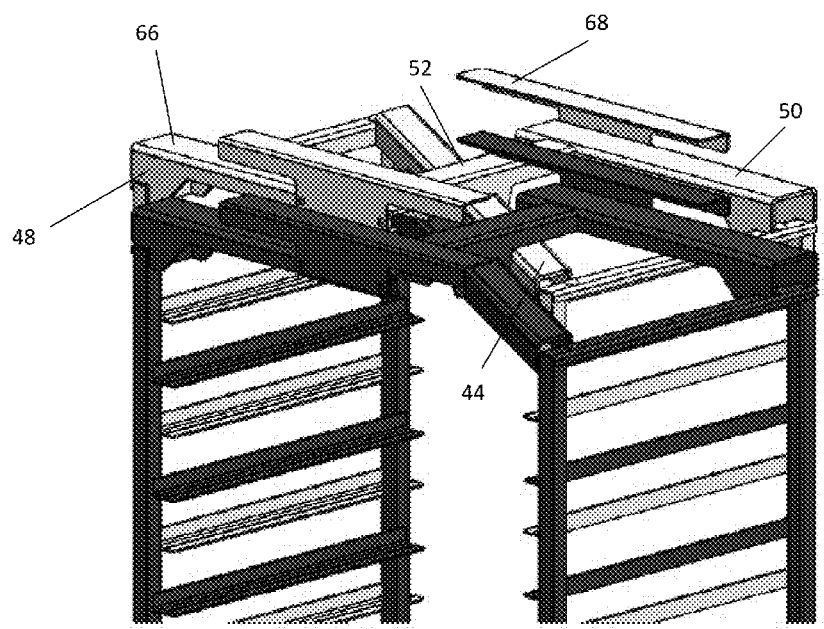
FIG. 28 is a perspective view of the tops of two racks of the fourth preferred embodiment nesting.
Figure 29:
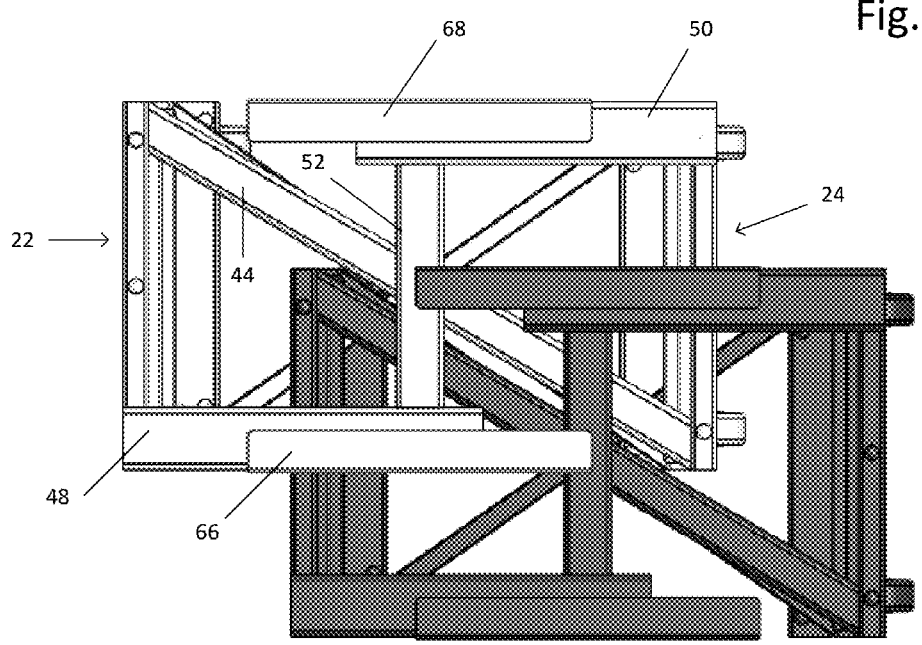
FIG. 29 is a top plan view of the tops of two racks of the fourth preferred embodiment nesting.

There is a first slot 34 in the first side panel 22, extending generally horizontally from the rear of the first side panel partway toward the front of the first side panel, in the plane of the first diagonal brace 32. The first slot 34 is sized and positioned to accommodate the first brace of another nesting bakery oven rack nested with the nesting bakery oven rack 20 at the rear, as shown in FIG. 2.

There is a second slot 36 in the second side panel 24, extending generally horizontally from the front of the second side panel toward the rear of the second side panel, also in the plane of the first diagonal brace 32. The second slot is sized and positioned to accommodate the first diagonal brace of another nesting bakery oven rack nested with the nesting bakery oven rack 20 at the front;

A second diagonal brace 38 adjacent the bottom 30 of the nesting bakery oven rack, extends from a point adjacent the front of the second side panel 24 to a point adjacent the rear of the first side panel 22. The ends of the second diagonal brace 38 are out of the horizontal plane of first diagonal brace 32 and the first and second slots 34 and 36 so that the second diagonal brace does not interfere with the nesting of the racks.

The can be one or more additional diagonal braces intermediate the top 40 and the bottom 30 of the nesting bakery oven rack. In this preferred embodiment there is a third diagonal brace 42 intermediate the top and bottom of the nesting bakery oven rack, extending from a point adjacent the front of the second side panel 24 to a point adjacent the rear of the first side panel 22.

There can also be an additional diagonal brace adjacent the top 40 of the nesting bakery oven rack 20. In this preferred embodiment there is a fourth diagonal brace 44 adjacent top 40 of the nesting bakery oven rack 20, extending from a point adjacent the front of the second side panel 24 to a point adjacent the rear of the first side panel 22.

There is preferably top support structure 46 on the top 40 of the nesting bakery oven rack 20. This support structure preferably comprises a front lateral support 48 extending partway from the first side panel 22 toward the second side panel 24 at the front 26 of the nesting bakery oven rack. A rear lateral support 50 extends partway from the second side panel 24 toward the first side panel 22 at the rear of the nesting bakery oven rack 20. A transverse member 52 extends between the front and rear lateral supports 48 and 50. The transverse member 52 preferably crosses and engages the fourth diagonal brace 44. Brackets 54 and 56 can be mounted on the lateral supports 50 and 52 respectively, so that the rack can be engaged by commercial oven.

Each of the side panels 22 and 24 is preferably mounted on a wheeled base 58, facilitating the movement of the rack 20.

As shown in the Figures, the first and second side panels 22 and 24 each comprises a front post 100 and a rear post 102, which can be made of square tubing. A bottom member 104 extends generally horizontally between the bottoms of the front and rear posts 100 and 102, and a top member 106 extends generally horizontally between the tops of the front and rear posts. A plurality of generally L-shaped brackets 108 extend generally horizontally between the front and rear posts 100 and 102 to support bakery trays between the side panels.

Each of the side panels 22 and 24 preferably also includes a C-shaped base 110, positioned between the bottom member 104 and the wheeled base 58. The first and second slots 34 and 36 are preferably formed in these C-shaped bases 110. In this preferred embodiment the first diagonal brace 32 extends between the C-shaped base 110 of the first side panel 22 and the C-shaped base 110 of the second side panel 24, and is preferably made of square tubing. In this preferred embodiment the second diagonal brace 38 comprises a first element 112 extending between the C-shaped base 110 of the second side panel 24 and the C-shaped base 110 of the first side panel 22, preferably in a plane above the plane of the first diagonal brace 32 so that the two do not interfere with each other. In this preferred embodiment the second diagonal brace 38 further comprises a second element 114 extending between the second side panel 24 and first side panel 24, for example between the wheeled bases 58, so that the second element 114 is in a plane below the plane of the first diagonal brace so that the two do not interfere with each other. One or more struts 116 can extend between the first and second elements 112 and 114, but the struts adjacent the ends of the elements 112 and 114 are positioned so that they do not interfere with the first diagonal brace of adjacent racks from entering the slots 34 and 36, so that a plurality of racks 20 can tightly nest.

A second embodiment of a nestable bakery oven rack, indicated generally as 20', is shown in FIGS. 12-17. Nestable bakery oven rack 20' is similar in construction to nestable bakery oven rack 20, and corresponding parts are identified with corresponding reference numerals. However, the top support structure 46' on the top 40 of the nesting bakery oven rack 20' is somewhat different from the top support structure 46 on the top 40 of the nesting bakery oven rack 20, so that the nestable bakery oven rack 20' can operate with different baking ovens. Rather than brackets 54 and 56, nestable bakery oven rack 20' has a fixture 60 mounted on the transverse member 52.

A third embodiment of a nestable bakery oven rack, indicated generally as 20", is shown in FIGS. 18-23. Nestable bakery oven rack 20" is similar in construction to nestable bakery oven racks 20 and 20', and corresponding parts are identified with corresponding reference numerals. However, the top support structure 46" on the top 40 of the nesting bakery oven rack 20" is somewhat different from the top support structure 46 on the top 40 of the nesting bakery oven rack 20, so that the nestable bakery oven rack 20" can operate with different baking ovens. Rather than supporting a transverse member 52 with brackets 54 and 56, the lateral supports 48" and 50" are shorter and each mounts a bracket 62 and 64 respectively. The brackets 62 and 64 can be secured to diagonal brace 44.

A fourth embodiment of a nestable bakery oven rack, indicated generally as 20''', is shown in FIGS. 24-29. Nestable bakery oven rack 20''' is similar in construction to nestable bakery oven racks 20, 20' and 20", and corresponding parts are identified with corresponding reference numerals. However, the top support structure 46''' on the top 40 of the nesting bakery oven rack 20''' is somewhat different from the top support structure 46 on the top 40 of the nesting bakery oven rack 20, so that the nestable bakery oven rack 20''' can operate with different baking ovens. Rather than transverse member 52 with brackets 54 and 56, the transverse member 52 carries longer brackets 66 and 68.

The nesting baking oven racks are preferably made primarily of aluminum which can be welded or secured with fasteners to provide sufficient rigidity, strength, and durability, as well as relatively light weight for easier handling. Of course the racks could be made of, or include parts made of, other materials.

Figure 30A:
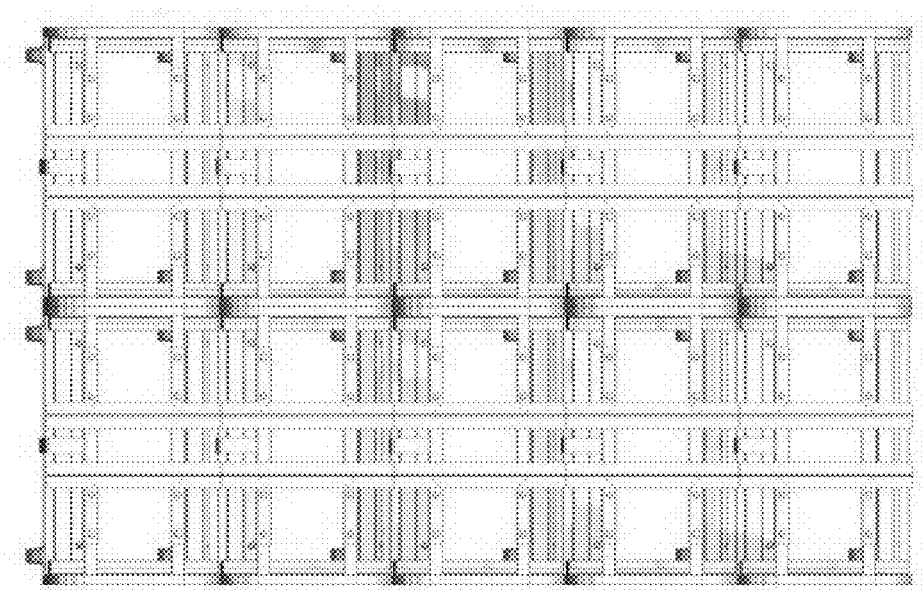
FIG. 30A is a top plan view of ten conventional oven baking racks arranged together to minimize the floor space they occupy.
Figure 30B:
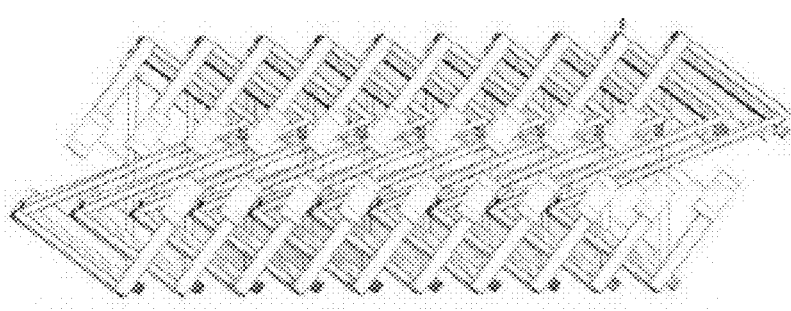
FIG. 30B is a top plane view of ten nesting oven baking racks in accordance with the principles of this invention, nesting together to minimize the floor space they occupy.

As shown in FIG. 30A ten conventional oven bakery racks take up a considerable amount of floor space (an area of 34.7 square feet is typical), even when grouped tightly together. However, as shown in FIG. 30B, with the tight nesting at the front and back permitted by the nesting oven baking racks, the space can be reduced substantially (to 13.5 square feet in the preferred embodiment). The construction allows the first and second side walls 22 and 24 of each rack to substantially overlap the first and second side walls of adjacent racks, with their first diagonal braces 32 of adjacent racks arranged in relatively closely spaced, parallel array. Note that FIGS. 30A and 30B are for illustrative purposes, and are not necessarily to scale.

Figure 31:
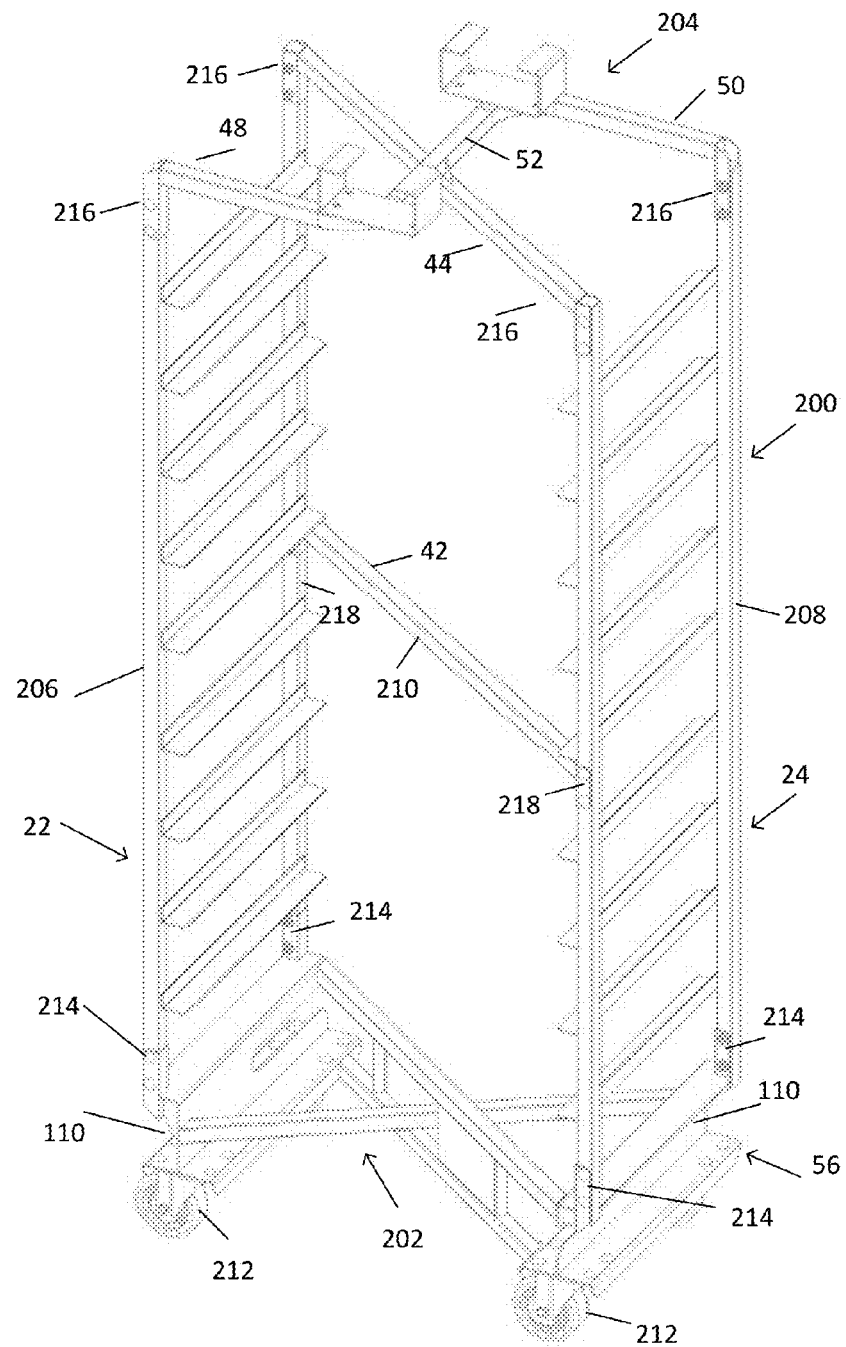
FIG. 31 is a perspective view of a second preferred embodiment of a nesting bakery oven rack in accordance with principles of this invention.
Figure 32:
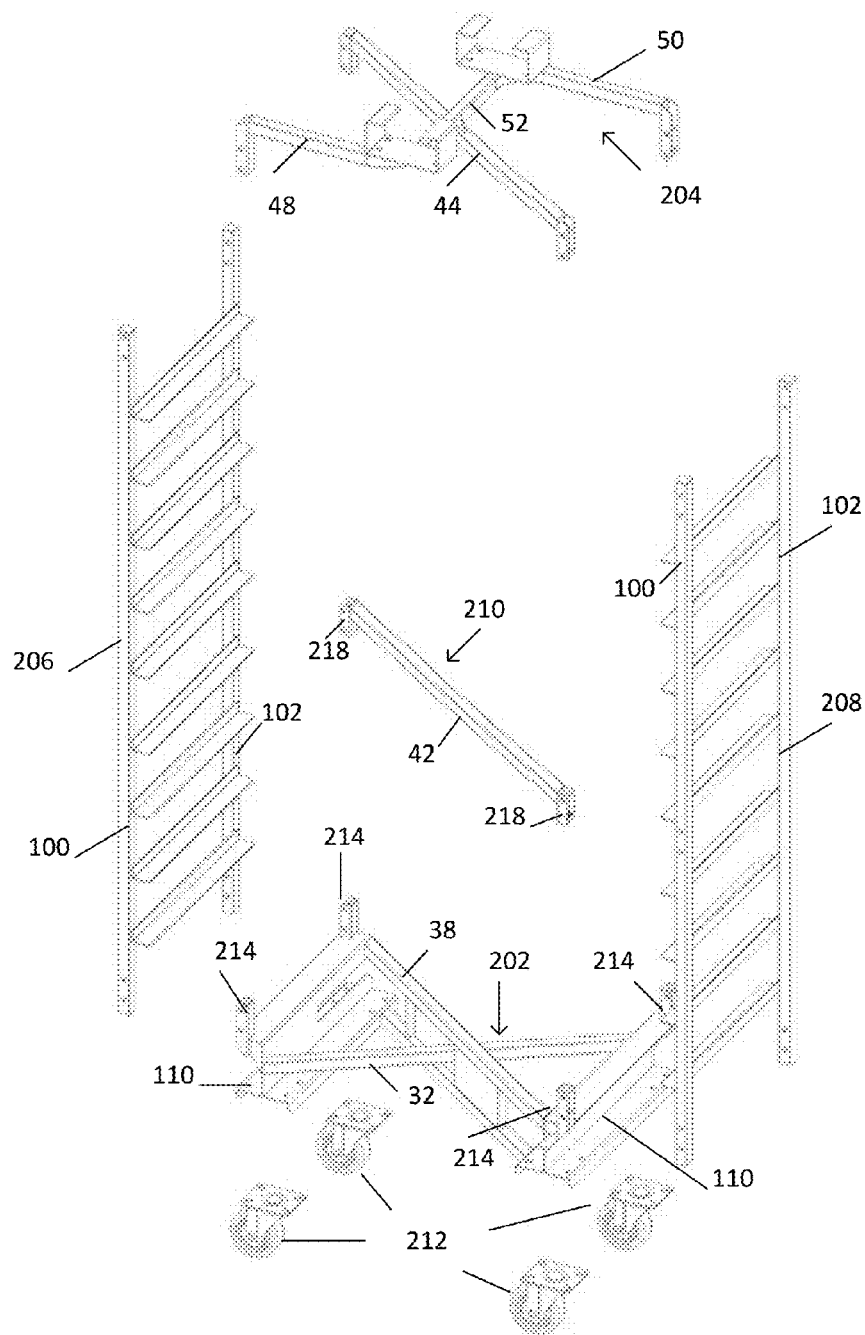
FIG. 32 is an exploded view of the second preferred embodiment.

As shown in FIGS. 31 and 32 some embodiments of bakery racks in accordance with the principles of the present invention can be assembled from a plurality of components that can be secured together with fasteners, such as nuts and bolts, so that the racks can be more easily stored and transported in a broken-down form. On such embodiment is indicated generally as 200 in FIGS. 31 and 32. As best shown in FIG. 32, a rack 200 can comprise a bottom section 202, a top section 204, side sections 206 and 208, a cross member 210, and a plurality of wheel or caster units 212.

As shown, the bottom section 202 can include the C-shaped base 110 of each of the side panels 22 and 24 of any of the previously described embodiments, as well as the first and second diagonal braces 32 and 38. The bottom section 202 can have projecting brackets 214 for engaging the first and second side sections 206 and 208 as described below.

The top section 204 can include the fourth diagonal brace 44 of any of the previously described embodiments, as well as any additional structure from the embodiment, such as lateral supports 48 and 50, transverse member 52, and brackets 54 and 56 of the first embodiment 20. The top section 204 can alternatively comprise the components forming the tops of one of the other embodiments 20', 20", or 20'''. The top section 204 can also include brackets 216 for engaging the first and second side members as described below.

The first and second side sections 206 and 208 can comprise the front and rear posts 100 and 102, and the plurality of brackets 108 that comprise the first and second side panels 22 and 24 of any of the previously described embodiments. Each of the front and rear posts can be engaged in one of the brackets 214 of the bottom section 202 and one of the brackets 216 of the top section 204, and secured with fasteners, such as bolts and nuts extending through the brackets 214, 216 and through their respective posts.

The cross member 210 can form the third diagonal brace 42 of any of the previously described embodiments. The cross member 210 can have brackets 218 on each of its ends for engaging the front post 100 of one of the side sections 206, 208 and the rear post 102 of the other of the side sections 206, 208, for example with nuts and bolts extending through the brackets and through their respective posts.

The wheel or caster units 212 can be secured to the base section 202, to form the wheeled bases 58 of any of the previously described embodiments.

Thus, a bakery rack in accordance with the principles of this invention could be broken down into, and assembled form, a several substantially flat pieces, which facilitates packing, storage, and transportation. While the brackets 214, 216 and 218, and show described herein are generally c-shaped channels adapted to receive a portion of a member with which they mate, and be secured thereto with bolts extending through aligned through-holes, with nuts engaging the bolts, the invention is not so limited and some other structure could be provided for securing the sections together. For example in some embodiments the brackets may comprise a member adapted to fit within another member, or some other configuration.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A nesting bakery oven rack comprising first and second vertical side panels extending between the front and the rear of the rack and a generally x-shaped base comprising a first diagonal brace adjacent the bottom of the nesting bakery oven rack, extending from a point adjacent the front of the first side panel to a point adjacent the rear of the second side panel; and a second diagonal brace adjacent the bottom of the nesting bakery oven rack, extending from a point adjacent the front of the second side panel to a point adjacent the rear of the first side panel, the ends of the second diagonal brace being out of the horizontal plane of the first brace to allow the nesting bakery oven rack to nest with a similar nesting bakery oven rack.

2. The nesting bakery oven rack according to claim 1 wherein there is an opening in the first side panel adjacent the rear, in the plane of the first diagonal brace, to receive and accommodate the first diagonal brace of another nesting bakery oven rack nested against the back of the nesting bakery cart.

3. The nesting bakery oven rack according to claim 2 wherein there is an opening in the second side panel adjacent the front, in the plane of the first diagonal brace, to receive and accommodate the first diagonal brace of another nesting bakery oven rack nested against the front of the nesting bakery cart.

4. A nesting bakery oven rack comprising:
first and second vertical side panels extending between the front and the rear of the rack;
a generally x-shaped base comprising a first diagonal brace adjacent the bottom of the nesting bakery oven rack, extending from a point adjacent the front of the first side panel to a point adjacent the rear of the second side panel; a first slot in the first side panel, extending from the rear of the first side panel toward the front of the first side panel, in the plane of the first diagonal brace, to accommodate the first brace of another nesting bakery oven rack nested with the nesting bakery oven rack at the rear; a second slot in the second side panel, extending from the front of the second side panel toward the rear of the second side panel, in the plane of the first diagonal brace, to accommodate the first diagonal brace of another nesting bakery oven rack nested with the nesting bakery oven rack at the front; and a second diagonal brace adjacent the bottom of the nesting bakery oven rack, extending from a point adjacent the front of the second side panel to a point adjacent the rear of the first side panel, the ends of the second diagonal brace being out of the horizontal plane of first brace.

5. The nesting bakery oven rack according to claim 4 further comprising at least one additional brace intermediate the top and bottom of the nesting bakery oven rack, extending from a point adjacent the front of the second side panel to a point adjacent the rear of the first side panel.

6. The nesting bakery oven rack according to claim 4 a front lateral support extending partway from the first side panel toward the second side panel at the front of the nesting bakery oven rack, a rear lateral support extending partway from the second side panel toward the first side panel at the rear of the nesting bakery oven rack; a transverse member extending between the front and rear lateral support.

7. The nesting bakery oven rack according to claim 6 further comprising at least one additional brace intermediate the top and bottom of the nesting bakery oven rack, extending from a point adjacent the front of the second side panel to a point adjacent the rear of the first side panel.

8. The nesting bakery oven rack according to claim 6 further comprising a top brace adjacent the top of the nesting bakery oven rack, extending from a point adjacent the front of the second side panel to a point adjacent the rear of the first side panel, wherein the transverse member crosses and engages the top brace.

9. The nesting bakery oven rack according to claim 8 further comprising at least one additional brace intermediate the top and bottom of the nesting bakery oven rack, extending from a point adjacent the front of the second side panel to a point adjacent the rear of the first side panel.

10. A nesting bakery oven rack comprising:
first and second vertical side panels extending between the front and the rear of the rack;
a first diagonal brace adjacent the bottom of the nesting bakery oven rack, extending from a point adjacent the front of the first side panel to a point adjacent the rear of the second side panel;
a first slot in the first side panel, extending from the rear of the first side panel toward the front of the first side panel, in the plane of the first diagonal brace, to accommodate the first brace of another nesting bakery oven rack nested with the nesting bakery oven rack at the rear;
a second slot in the second side panel, extending from the front of the second side panel toward the rear of the second side panel, in the plane of the first diagonal brace, to accommodate the first diagonal brace of another nesting bakery oven rack nested with the nesting bakery oven rack at the front;
a second diagonal brace adjacent the bottom of the nesting bakery oven rack, extending from a point adjacent the front of the second side panel to a point adjacent the rear of the first side panel, the ends of the second diagonal brace being out of the horizontal plane of first brace;
a third diagonal brace intermediate the top and bottom of the nesting bakery oven rack, extending from a point adjacent the front of the second side panel to a point adjacent the rear of the first side panel;
a fourth diagonal brace adjacent top of the nesting bakery oven rack, extending from a point adjacent the front of the second side panel to a point adjacent the rear of the first side panel;
a front lateral support extending partway from the first side panel toward the second side panel at the front of the nesting bakery oven rack, a rear lateral support extending partway from the second side panel toward the first side panel at the rear of the nesting bakery oven rack; a transverse member extending between the front and rear lateral support; the transverse member crossing and engaging the fourth diagonal brace.

* * * * *